US 7,701,637 B2

(12) United States Patent
Redert

(10) Patent No.: US 7,701,637 B2
(45) Date of Patent: Apr. 20, 2010

(54) OPTICAL SYSTEM FOR 3 DIMENSIONAL DISPLAY

(75) Inventor: Peter-Andre Redert, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 29 days.

(21) Appl. No.: 12/092,415

(22) PCT Filed: Oct. 25, 2006

(86) PCT No.: PCT/IB2006/053923

§ 371 (c)(1),
(2), (4) Date: May 2, 2008

(87) PCT Pub. No.: WO2007/052183

PCT Pub. Date: May 10, 2007

(65) Prior Publication Data

US 2008/0278808 A1    Nov. 13, 2008

(30) Foreign Application Priority Data

Nov. 2, 2005  (EP) ................................. 05110260

(51) Int. Cl.
*G02B 27/10*  (2006.01)
*G02B 27/22*  (2006.01)
(52) U.S. Cl. .................... 359/621; 359/478; 359/462
(58) Field of Classification Search .................. 348/51, 348/54, 59; 359/462, 463, 464, 478, 619, 359/621, 622, 626
See application file for complete search history.

(56) References Cited

U.S. PATENT DOCUMENTS 6,014,259 A    1/2000  Wohlstadter
6,064,424 A    5/2000  Van Berkel et al.
6,801,243 B1   10/2004  Van Berkel
2001/0050686 A1  12/2001  Allen

FOREIGN PATENT DOCUMENTS

| JP | 2004144874 A | 5/2004 |
| JP | 2004157270 A | 6/2004 |
| WO | WO9810402 A1 | 3/1998 |
| WO | WO0144858 A2 | 6/2001 |
| WO | WO03058556 A1 | 7/2003 |

OTHER PUBLICATIONS

Van Berkel, C.: "Image Preparation for 3D-LCD"; Part of the IS&T SPIE Conference on Stereoscopic Displays and Applications. San Jose, CA., Jan. 1999, Proc. SPIE vol. 3639, pp. 84-91.

*Primary Examiner*—David N Spector
(74) *Attorney, Agent, or Firm*—Larry Liberchuk

(57) ABSTRACT

An optical system or front end for adding an optical depth information to a two-dimensional image (1), wherein the optical system includes an array of optical lenses (2) arranged in front of the two-dimensional image (1). The optical lenses have adjustable focal length (strength) in response to the optical depth information (D). An optical barrier (3) is arranged in front of the array of optical lenses (2) with optical apertures aligned with the optical lenses of the array of optical lenses (2). Such optical front end can be used for 3D displays based on known 2D displays including LCD, LCOS, Plasma, and CRT type displays. Such a 3D display does not suffer from a resolution loss depending on a number of viewing angles. In embodiments adapted for pixelized 2D displays, the array of optical lenses preferably has one lens per pixel. The barrier (3) may be fixed or adjustable to allow adjustment of the characteristics of the added optical depth. The lenses and apertures of the barrier (3) may be shaped so as to be adapted for either horizontal or vertical viewing angles, or for both. The array (2) of lenses may be based on electro-wetting lenses, fluid-focus lenses, or lenses of bi-refringent LC materials. The array of lenses (2) may be formed by a stack of two or more arrays of lenses.

14 Claims, 1 Drawing Sheet

OPTICAL SYSTEM FOR 3 DIMENSIONAL DISPLAY

Figure 1:
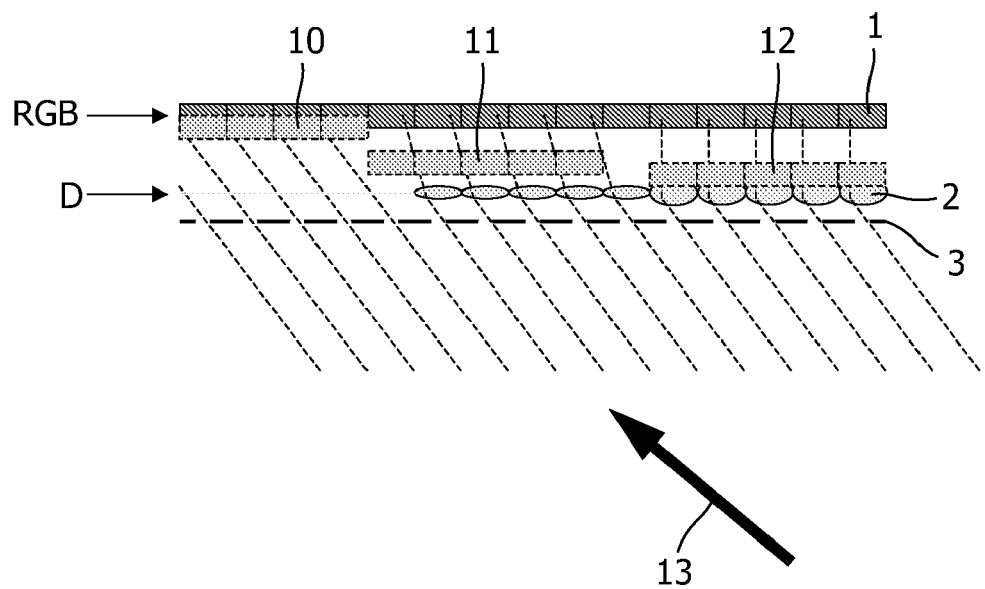

The invention relates to the field of three-dimensional (3D) display of images and/or video signals. Especially, the invention provides an optical system suited for use with a conventional two-dimensional (2D) display. In addition, the invention provides a 3D display device and a method for providing a 3D effect based on a 2D image.

BACKGROUND OF THE INVENTION

In broadcast television systems, 3D television (3DTV) might be the next revolution after the introduction of color TVs. In professional applications (medical/industrial), 3D visualization is already commonplace. In entertainment and mobile communication, 3D visualization is of upcoming commercial interest.

One type of 3D display is the auto-stereoscopic multi-view display, such as the 3D-LCD described in [C. van Berkel, "Image preparation for 3D-LCD", *Proc SPIE*, Vol. 3639, pp. 84-91, 1999]. This display provides free 3D viewing for multiple viewers, without the need for special 3D-glasses. It is composed of a standard 2D matrix display followed by some optical front end.

A serious problem of these displays is the resolution. The optical front end distributes the original spatial resolution of the 2D matrix display over spatial and angular resolution. The latter is called the 'number of views' $N_{views}$. Current displays have $N_{views}$~10, leading to a loss of spatial resolution of a factor ~10.

Current developments partially solve the resolution loss via switchable displays. The optical front-end can be switched on or off, leading to 3D imaging with reduced resolution, or 2D imaging with full 2D resolution. Current switching principles based on lenses result in additional performance loss, due to lower refractive power of adjustable lenses compared to fixed lenses.

Multi-view displays require $N_{views}$~100 to meet high-quality depth and viewing angle requirements. This leads to severe resolution loss.

Finally, current displays only provide horizontal angular resolution. This is sufficient in normal viewing conditions. In several cases however, viewing is impaired. Vertical movements of the viewer lead to elasticity in the 3D image. The 3D effect is lost if the display is rotated 90°, e.g. for document writing, or if the viewer rotates his head (e.g. watching TV from the coach). Adding vertical angular resolution leads to an additional factor resolution loss (in total e.g. $N_{views;x} * N_{views;y}$).

U.S. Pat. No. 6,014,259 describes an alternative 3D display with a display producing a 2D image of a plurality of pixels and an optical front end inserted in front thereof with the purpose of providing an optical depth to the image produced by the display. The front end includes an array of micro-lenses arranged in front of the display, wherein each of the micro-lenses of the array is aligned with one pixel, one micro-lens per pixel. A focal length of each of the micro-lenses can be adjusted in response to a depth information, and thus an optical depth can be applied to the 2D image. In theory such display could be viewed from a large variety of viewing angles. However, in practice, the described display does not work satisfactory with conventional 2D displays—the result is severe visual artifacts: the image looks blurred and ghosted, as if several slightly displaced copies are visible at the same time.

It may be seen as an object of the present invention to provide a method and an optical system that can add optical depth information to a 2D image such as produced by a conventional 2D display and without loss of spatial resolution of the 2D display.

In a first aspect the invention provides an optical system adapted to add an optical depth information to a two-dimensional image, the optical system comprising an array of optical lenses arranged in front of the two-dimensional image, wherein a focal length of the optical lenses is adjustable in response to the depth information, an optical barrier arranged in front of the array of optical lenses, wherein optical apertures of the optical barrier are aligned with the optical lenses of the array of optical lenses.

The optical system according to the first aspect can serve as an optical front-end to be arranged in front of a 2D image and provide an optical depth to the 2D image. The optical system is applicable to all 2D images, e.g. printed or from displays, such as Liquid Crystal Displays (LCDs), Plasma displays, Liquid Crystal on Silicon (LCOS) displays, and Cathode Ray Tube (CRT) displays.

The spatial resolution of the 2D image with added optical depth is determined by the minimum of the resolutions of the original 2D image and a pitch of the optical front-end (i.e. a pithc of the lenses and the barrier). Typically, for pixelized 2D images from e.g. an LCD monitor, the pitch of lenses and barriers is chosen equal to the pixel pitch, or smaller, in order not to degrade the final spatial resolution. Then, the original spatial resolution of the 2D image is thus retained, while depth has been added to the image.

As will become evident, the depth created by the optical system can be characterized by an effective number of views $N_{views}$, similar to existing multiview displays. With the optical system, there is no resolution loss, regardless of $N_{views}$. Horizontal and/or vertical angular resolution is equally obtainable.

By adjustable focal length of the optical lenses is to be understood any adjustable optical property of the optical lenses that influences the focal length. Such arrays exist that are capable of adjusting focal length by means of applying an electrical current individually to each optical lens—e.g. GRIN lenses, or the so-called fluid-focus lenses.

With the optical system according to the first aspect rendering is not needed to provide 3D images, i.e. there is no need for powerful signal processors or the like to provide a 3D image based on a video signal with a depth information, e.g. the RGBD video signal (Philips Research 3D video standard). The depth part D of such RGBD signal is used to control the focal length of the optical lenses pixel-wise, e.g. based on a simple conversion formula, and the 2D image part RGB of the RGBD signal is applied to a 2D display behind the optical system in a conventional manner.

With the optical system it is possible to select the array of lenses and the barrier to a large variety of viewing angles—both vertical and horizontal viewing angles can be obtained.

In preferred embodiments the array of optical lenses and the optical barrier are each substantially flat, i.e. they each extend in one plane. This is especially preferred in combination with a flat 2D display. However, if the 2D display has a curved surface, such as a CRT display, then the array of optical lenses and the optical barrier preferably are shaped with an according curve, but this is not essential.

The optical system will provide a brightness loss equal to the brightness loss in multi-view displays based on barrier front-end optics.

In some embodiments the optical barrier is a fixed optical barrier. Alternatively, the optical barrier is adjustable so as to allow adjustment to display characteristics such as amount of depth and viewing angle. Especially, it is possible to provide online adjustment of angular resolution, as will be explained in more detail later.

Preferably, the array of optical lenses and the optical barrier covers the entire 2D image to be applied with optical depth information, however for certain application it may be preferred that the array of optical lenses and the optical barrier covers only a part of the 2D image.

In case of a pixelized 2D image, preferably the array of optical lenses includes substantially one optical lens aligned in front of each of the pixels of the 2D image, or more than one (when the number of lenses is lower than the number of pixels, the spatial image resolution will be degraded).

Preferably, the focal length of the optical lenses is individually adjustable for each lens. Embodiments for pixelized 2D displays are well suited for receiving e.g. a video signal including a pixel-wise depth information.

The lenses of the array of optical lenses are preferably selected from the group consisting of: electro-wetting lenses, fluid-focus lenses, and lenses of bi-refringent LC materials. However, in principle any given type of micro-lenses with adjustable optical properties may be used.

In order to reduce misalignment effects of the 2D image and the optical depth information provided thereon, the optical system may comprise a spatial low-pass filter adapted to spatially low-pass filter the depth information, i.e. the depth part D of an RGBD video signal, prior to serving to adjust the focal length of the lenses.

In embodiments suited for a 3D display with angular resolution in one direction only, e.g. in a horizontal direction, the optical lenses preferably have a substantially cylindrical shape, and the optical apertures of the optical barrier preferably have a substantially elongated shape, i.e. the apertures elongating in a direction substantially parallel with a central axis of the cylindrically shaped optical lenses.

In another embodiment suited for a 3D display with both vertical and horizontal angular resolution the optical lenses preferably have a substantially spherical shape, and a shape of the optical apertures of the optical barrier is preferably selected from the group consisting of: circular, triangular, and rectangular.

The array of optical lenses may comprise a stack of two or more arrays of substantially two-dimensional arrays of optical lenses, yielding an effective array of lenses with increased strength in order to increase the depth effect.

In a second aspect, the invention provides a method for applying an optical depth information to a two-dimensional image, the method comprising the steps of applying an array of optical lenses in front of the two-dimensional image, applying an optical barrier in front of the array of optical lenses, wherein optical apertures of the optical barrier are aligned with the optical lenses of the array of optical lenses, and adjusting a focal length of the optical lenses in response to the optical depth information.

In principle the same advantages, embodiments and applications as described above for the first aspect apply for the second aspect as well.

In a third aspect the invention provides a three-dimensional display device adapted to receive a video signal including a depth information, the three-dimensional display device comprising a display arranged to display a two-dimensional image representing the video signal, and an optical system comprising:

an array of optical lenses arranged in front of the two-dimensional image, wherein a focal length of the optical lenses is adjustable in response to the depth information of the video signal, an optical barrier arranged in front of the array of optical lenses, wherein optical apertures of the optical barrier are aligned with the optical lenses of the array of optical lenses.

The 3D display according to the third aspect can be formed by a conventional 2D display of any known type with the optical system arranged in front thereof. The 3D display is well suited for receiving a video signal of the RGBD type, where the 2D part RGB of the signal is applied to the 2D display and the depth information part D of the video signal is applied to the optical system and used to control the focal length of the optical lenses in response to the depth information part D.

In principle the same advantages, embodiments and applications as described above for the first aspect apply for the third aspect as well.

It is appreciated that the three aspects of the invention are applicable for any type of product including 3D imaging facilities. For example TV sets such as 3DTV, computer displays, handheld computers, mobile phones, mobile games and the like, large displays for showing commercials or for showing public event, e.g. sport events or concerts. Within medical applications the invention can be applied to 3D displays for 3D imaging of scanning results or for a 3D display for assisting a surgeon in navigating in a complicated surgical treatment, or in a virtual reality operation for training purposes.

Figure 2:
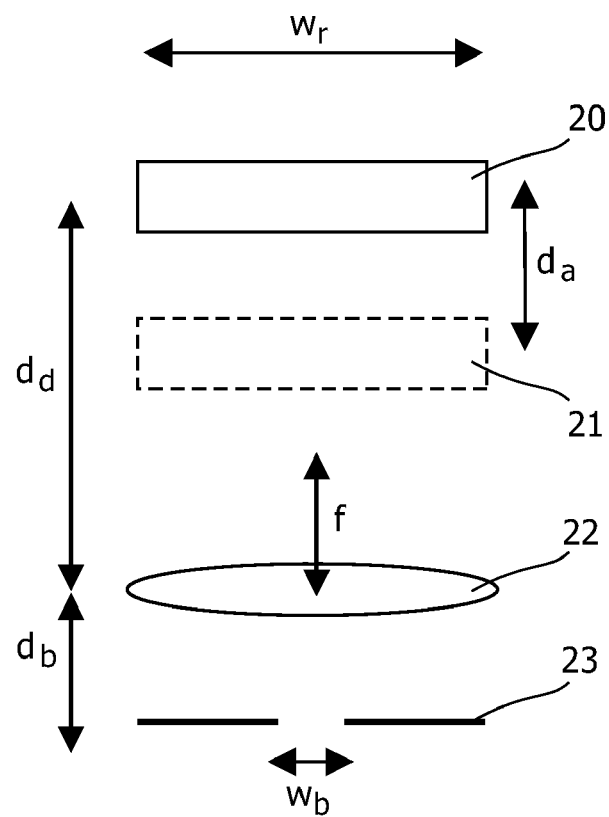

In the following the invention is described in more details with reference to the accompanying figures, of which FIG. 1 illustrates a top view of a one scan line of an embodiment of a 3D display according to the invention, and FIG. 2 illustrates physical quantities of a 3D display embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

For ease of explanation, an embodiment with a pixelized 2D display is described. In case of an unpixelized 2D image source (e.g. a black and white CRT, or a print such as a photo or a poster), effective pixels can be defined that have a size related to the resolution (sharpness) of the unpixelized image, and the following description still applies.

FIG. 1 shows, for illustration purpose, only one scan-line (i.e. one dimension) of an entire 3D display according to the invention in a top view. The 3D display is adapted to receive an RGBD video signal. An RGB part of the video signal is applied to a conventional 2D display 1 of which 15 pixels of one scan line are illustrated. The pixels of the 2D display 1 displays an image representing the RGB video signal. An optical system (i.e. an optical front-end) 2, 3 is adapted to provide a depth dimension according to the depth information part D of the video signal. The optical front-end includes an array of optical lenses 2 and an optical barrier 3. An array of optical lenses 2 is arranged in front of the 2D display 1. As illustrated, each of the optical lenses of the array of optical lenses 2 is aligned with a pixel of the 2D display 1, thus there is one optical lens for each pixel. The depth information part D of the RGBD video signal is applied to the array of optical lenses 2, this array of optical lenses 2 providing a variable focal length of each of the individual optical lenses, regulated in accordance with the depth information D. An optical barrier 3 is arranged in front of the array of optical lenses 2, the optical barrier 3 having optical apertures aligned with the optical lenses of the array of optical lenses 2 and thus, the optical apertures are also aligned with the pixels of the 2D display 1. The optical barrier is preferably a fully opaque plate, with optical apertures formed as holes at the location of each lens.

When all the lenses of the array of optical lenses 2 are turned off (i.e. adjusted to infinite focal length), the apparent image for a viewer will be located at the 2D display 1. The optical front-end's 2, 3 only effect is dimming of the light from the 2D display 1. When the lenses of the array of optical lenses 2 have a non-zero strength (finite focal length), the apparent image will be in between the 2D display 1 and the viewer, possibly even beyond the optical front-end 2, 3. When the focal lengths of the lenses of the array of optical lenses 2 are adjusted per pixel according to D, an appropriate 3D image will appear, with different image content appearing at different depths.

An example of an apparent image (or apparent location of pixels) 10, 11, 12 is illustrated in FIG. 1 as dashed boxes for a specific viewing angle indicated by arrow 13, and for a specific adjustment of the lenses. As sketched by a line, the lenses to the left of the array of optical lenses 2 are adjusted to infinite focal length, i.e. they have essentially no optical effect, and thus a resulting in an apparent image 10 coinciding with the 2D display 1. Five lenses in the middle of the array of optical lenses 2 are illustrated to be adjusted to a "middle" focal length different from and thus resulting an apparent image 11 between the 2D display 1 and the array of optical lenses 2. The five lenses to the right are illustrated as adjusted to a "low" focal length and thus resulting in an apparent image 12 of the pixels to the right being closer to the array of optical lenses 2 than the apparent image 11 of the middle pixels. The effect of the lenses and thus the position of the apparent image 10, 11, 12 is illustrated by the rays of light indicated with dashed lines from each pixel, via the array of optical lenses 2, via the optical apertures of the optical barrier in the viewing direction 13.

For a display with horizontal angular resolution only, the lenses preferably have a cylindrical shape and the optical apertures of the optical barrier 3 are preferably elongated vertical stripes, the stripes extending in a direction parallel with a center axis of the cylindrically shaped lenses. For a display with both horizontal and vertical angular resolution, the lenses preferably have spherical shape and the optical apertures of the optical barrier are preferably confined to e.g. circular, square, triangular or the like, shapes per lens.

Due to the different alignment of the optical front-end with respect to the display under varying viewing positions, the display will not show exactly the same as a conventional multi-view display in normal use. This unintended visual effect can be reduced by low-pass filtering the depth information D prior to applying it to the optical lenses, and/or dilating foreground objects (deliberately introducing depth halos).

FIG. 2 illustrates, for simplicity, a single pixel 20 of the 3D display 1 of FIG. 1. Various physical parameters related to 2D display 1, array of optical lenses 2 and optical barrier 3 and the resulting effects thereof are illustrated in FIG. 2. The width of a pixel 20 of the display is denoted $w_r$. Optical lens 22 of the array of optical lenses 2 is adjusted to a focal length of f, and it is arranged at a distance of $d_d$ from the pixel 20. The optical barrier 23 is arranged at a distance of $d_b$ from the center of the optical lens 22. Only one optical aperture of the optical barrier 23 is illustrated. A width of this optical aperture is denoted $w_b$. A resulting apparent image 21 of the pixel 20 is illustrated with a dashed box positioned at a distance of $d_a$ from the pixel 20. Based on FIG. 2 the following can be determined:

2D display resolution: $\quad w_r \quad$ (1)

3D display viewing angle: $\quad \alpha_{display} = 2\tan^{-1} \frac{w_r}{2d_b} \quad$ (2)

Angle of one effective "view": $\quad \alpha_{view} = 2\tan^{-1} \frac{w_b}{2d_b} \sim \frac{w_b}{d_b} \quad$ (3)

Effective "Number of views": $\quad N_{views} \sim \frac{w_r}{w_b} \quad$ (4)

Relative brightness output: $\quad \beta = \frac{w_b}{w_r} \sim N_{views}^{-1} \quad$ (5)

Apparent depth: $\quad d_a = \frac{d_d d_b}{f} \quad$ (6)

If a viewer is outside the viewing angle, the 3D image will repeat itself, similar to the several zones provided by conventional multi-view displays.

The total range of apparent depth is limited by the maximum lens strength (minimal f) and, similarly to existing multiview displays, by the number of views $N_{views}$.

The optical barrier 2 may be made adjustable, enabling online adjustable 3D display features. Such adjustment of the optical barrier may include adjusting its position relative to the lenses, either mechanically, or optically e.g. by a barrier that enables the aperture' shape, size and location to be adjusted. With adjusting $w_b$, the trade-off between brightness and effective number of views (and thus the amount of depth effect) can be adjusted.

For $N_{views}=1$ (and all lenses in "off" mode), the display is back in 2D mode.

Most pixelized 2D displays have so-called irrelevant pseudo-details; within a pixel there is some structure that should not be visible, e.g. an RGB dot pattern that should be small enough to be below the viewer's perception resolution limit. Such pseudo-details may cause interference with the optical front-end. This can be solved by choosing the resolution ($w_r$) of the optical front-end better (smaller $w_r$) than the smallest pseudo-detail. For an RGB dot pattern, this may cause $w_r$ to chosen a factor 0.1-1 times the pixel size. Other solutions are e.g. to align the RGB dot pattern at an appropriate angle with the lenses. This applies only for horizontal or vertical parallax front-ends (not both). Typically, the lenses should be aligned substantially perpendicular due to the RGB dot pattern.

An important feature of the invention is that for every viewing position, only a fraction of each lens contributes to the light output. Therefore, very strong lenses can be used with view-point and location-within-lens dependent focal length f. The so-called lens power measure of numerical aperture, $w_r/f$ is normally bounded by about 1, limiting performance in conventional multi-view displays. According to the present invention lenses beyond this limit may be used. However, adjustable lenses in general have less power than fixed lenses. Therefore, we assume that our lenses are limited to a numerical aperture of $w_r/f\sim1$, which gives a depth range for $d_a$ of:

$$d_a \in \left[0, \frac{d_d}{2\tan\frac{1}{2}\alpha_{display}}\right] \quad (7)$$

From (2) and (7) it is seen that it is possible to freely adjust both the 3D display's viewing angle $\alpha_{display}$ and the depth range. For tan $\alpha_{display}$~1, the depth range is equal to the front-end's location $d_d$. For smaller viewing angles $\alpha_{display}$, the depth ranges increases.

In a preferred embodiment, the following values are preferred: $w_r$~1 mm, $w_b$~0.1 mm, $d_b$~2 mm, and $d_d$~1 cm. These values lead to: $\alpha_{display}$~28°, $N_{views}$~10, $d_a$~0-2 cm and $\beta$~0.1.

Adjustable lenses are currently available within Philips Research in different forms, e.g. by electro-wetting or fluid-focus, and by bi-refringent LC materials as used currently in switchable 2D/3D displays. Multiple lens layers can be stacked to increase the numerical aperture. Fixed barriers are made very easily, and adjustable barriers equal high-resolution black/white transmissive displays (pure black/white as grey levels are not needed). Barriers exist in per-pixel adjustable versions: they are just grey-level LCD panels without backlight. Adjustable lenses with $w_r$~1 mm, e.g. based on bi-refringent LC materials, can easily be manufactured with current technology.

The only processing required for the display is the conversion of depth D to $d_a$ and the appropriate drive signal for the lenses to acquire the appropriate focal length f. This is relatively simple processing that involves only pixel-wise operations (no inter-pixel operations). The processing typically comprises scaling from D to $d_a$, e.g. using patent application WO 2003058556 A1 "Method of and scaling unit for scaling a three-dimens. model and display apparatus", followed by the lens adaptation driver that must apply a known, possibly non-linear mapping from $d_a$ to the lens driver signal.

The widths ($w_r$) of display pixels, lenses and barrier was chosen equal in the description above, but they can be made very slightly different. The use of $w_{r;display}$~$w_{r;lens}+\delta$-$w_{r;barrier}+2\delta$ enables the viewing angle of every pixel to be aimed slightly different for each pixel, coming to a common 'focus' at some viewer position. This is common practice in conventional multi-view displays. Once this has been accomplished, the 'focus' works at any viewer position.

In the claims reference signs to the figures are included for clarity reasons only. These references to exemplary embodiments in the figures should not in any way be construed as limiting the scope of the claims.

The invention claimed is:

1. An optical system for adding an optical depth information to a two-dimensional image, comprising:
    an array of optical lenses arranged in front of the two-dimensional image, wherein a focal length of the optical lenses is adjustable in response to the optical depth information; and
    an optical barrier arranged in front of the array of optical lenses, wherein optical apertures of the optical barrier are aligned with the optical lenses of the array of optical lenses.

2. Optical system according to claim 1, wherein a size of the optical lenses of the array of optical lenses is substantially equal to or smaller than a resolution of the two-dimensional image.

3. Optical system according to claim 1, wherein the two-dimensional image includes a plurality of pixels.

4. Optical system according to claim 3, wherein a size of the optical lenses of the array of optical lenses is substantially equal to or smaller than the pixels of the two-dimensional image.

5. Optical system according to claim 1, wherein the optical barrier is a fixed optical barrier.

6. Optical system according to claim 1, wherein the optical barrier is adjustable so as to allow adjustment of the characteristics of the added optical depth.

7. Optical system according to claim 1, wherein the focal length of the optical lenses is individually adjustable for each lens.

8. Optical system according to claim 1, wherein the lenses of the array of optical lenses are selected from the group consisting of: electro-wetting lenses, fluid-focus lenses, and lenses of bi-refringent LC materials.

9. Optical system according to claim 1, further comprising a spatial low-pass filter adapted to spatially low-pass filter the depth information prior to serving to adjust the focal length of the lenses.

10. Optical system according to claim 1, wherein the optical lenses have a substantially cylindrical shape, and wherein the optical apertures of the optical barrier have a substantially elongated shape.

11. Optical system according to claim 1, wherein the optical lenses have a substantially spherical shape, and wherein a shape of the optical apertures of the optical barrier is selected from the group consisting of: circular, triangular, and rectangular.

12. Optical system according to claim 1, wherein the array of optical lenses comprises a stack of at least two arrays of substantially two-dimensional arrays of optical lenses.

13. A method for applying an optical depth information to a two-dimensional image, comprising:
    applying an array of optical lenses in front of the two-dimensional image;
    applying an optical barrier in front of the array of optical lenses, wherein optical apertures of the optical barrier are aligned with the optical lenses of the array of optical lenses; and
    adjusting a focal length of the optical lenses in response to the optical depth information.

14. A three-dimensional display device adapted to receive a video signal including a depth information (D), the three-dimensional display device comprising:
    a display arranged to display a two-dimensional image representing the video signal, and
    an optical system comprising:
        an array of optical lenses arranged in front of the two-dimensional image, wherein a focal length of the optical lenses is adjustable in response to the depth information of the video signal,
        an optical barrier arranged in front of the array of optical lenses, wherein optical apertures of the barrier are aligned with the optical lenses of the array of optical lenses.

* * * * *